United States Patent

Lloyd

[15] 3,648,399
[45] Mar. 14, 1972

[54] FISH HOOK RELEASING DEVICE

[72] Inventor: Kenneth R. Lloyd, 251 Coach Lamp Lane, Houston, Tex. 77037

[22] Filed: Dec. 15, 1969
[21] Appl. No.: 885,040

[52] U.S. Cl. ........................................................43/43.12
[51] Int. Cl. .....................................................A01k 91/04
[58] Field of Search ..........................43/42.02, 17.2, 43.12

[56] References Cited

UNITED STATES PATENTS

| | | | |
|---|---|---|---|
| 2,733,537 | 2/1956 | Elsberg | 43/43.12 |
| 3,217,443 | 11/1965 | Goodman | 43/43.12 |
| 3,518,784 | 7/1970 | Kling et al | 43/43.12 |
| 2,392,335 | 1/1946 | Morrill | 43/43.12 |
| 2,907,134 | 10/1959 | Trantvetter | 43/43.12 |
| 3,037,315 | 6/1962 | Klawitter | 43/17.2 UX |

FOREIGN PATENTS OR APPLICATIONS 587,043    11/1959    Canada.................................43/43.12

Primary Examiner—Samuel Koren
Assistant Examiner—George M. Yahwak
Attorney—Ranseler O. Wyatt

[57] ABSTRACT

A device for releasing a fish hook from a fishing line when engaged with a fixed object in the water, without loss of any portion of the fishing equipment other than the fish hook itself.

3 Claims, 3 Drawing Figures

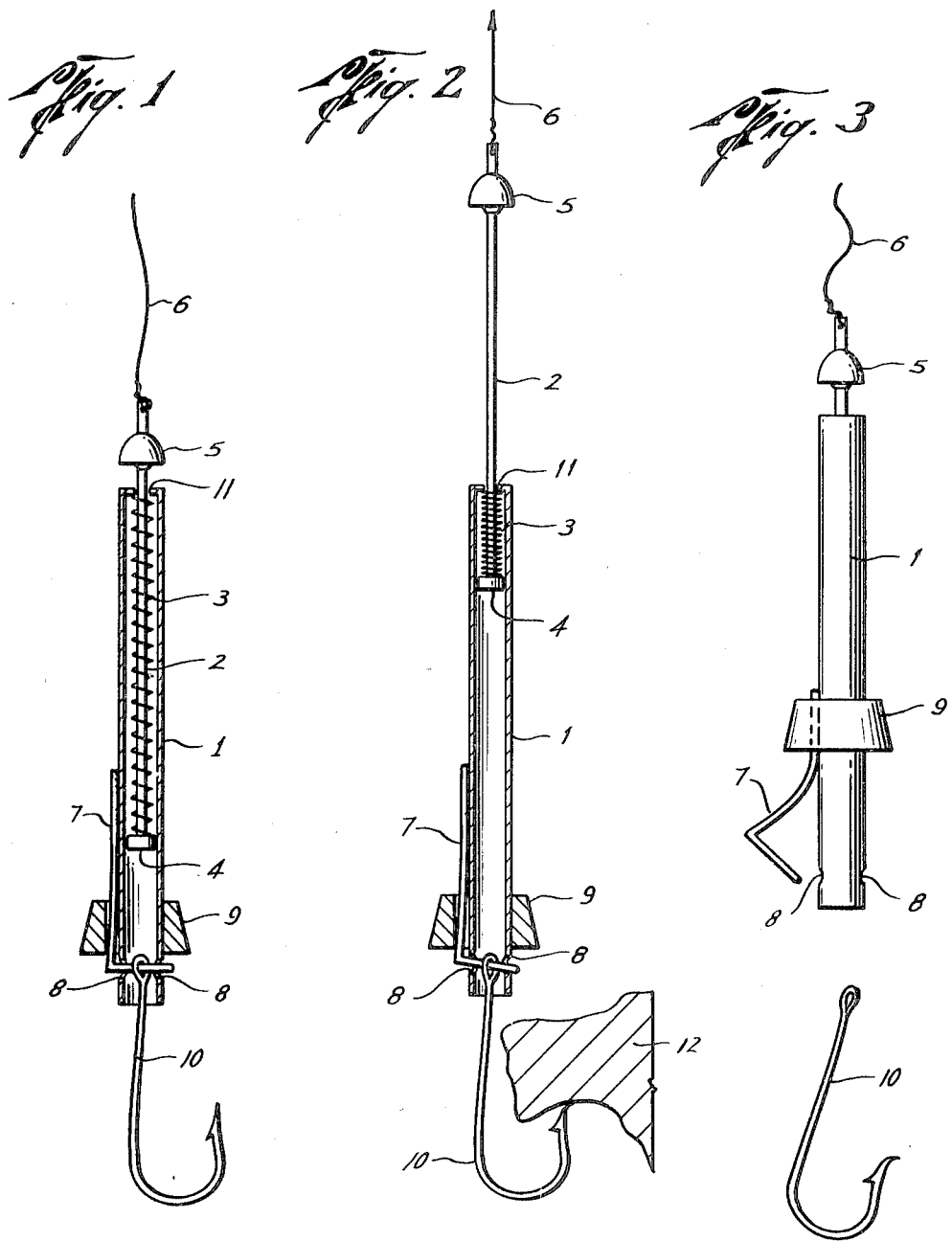

FISH HOOK RELEASING DEVICE

SUMMARY OF THE INVENTION

A device to be secured to a lead on a fishing line, to receive a fish hook and releasably maintain same on said line, and that is releasable from said line by manipulation of the fishing equipment when the hook becomes engaged with a fixed object in the water.

BRIEF DESCRIPTION OF THE DRAWINGS

FIG. 1 is a side elevational view, in cross section, showing the fish hook mounted on the releasing device.

FIG. 2 is a side elevational view, in cross section, showing a fish hook engaged with a fixed object and the releasing device is in position preparatory to releasing the hook, and FIG. 3 is a side elevational view of the device in hook released position.

DESCRIPTION OF THE PREFERRED EMBODIMENT

In the drawings the numeral 1 designates a tubular housing having one end open, and having a plunger 2 yieldably maintained therein and maintained under tension by the spring 3 and extended through the port 11 in the other end of the housing 1 and having the flanged terminal 4 adapted to engage the spring [2] 3 at one end and the flange 5 at the other end, said flange 5 limiting the downward movement of the plunger 2. A fishing line, or leader, 6 is secured to the extended end of the plunger 2.

A spring wire 7 is mounted on the outer surface of the tubular housing 1, and is bent at its free end, at a right angle, to pass through the ports 8, 8 in the housing 1. A collar 9 is loosely mounted on the housing 1 and extends over the spring wire 7.

In use, a fish hook, as 10, is inserted into the open end of the housing 1 and the free end of the spring wire 7 is passed through one of the ports 8 and through the eye of the fishhook and then through the other port 8, and is maintained in this position by the collar 9 which is limited in its downward movement on the housing 1 by the projecting end of the wire 7. When the hook 10 becomes engaged with a fixed object, as 12, in the water, the user draws on the line 6, moving the plunger upwardly through the housing 1 to the position shown in FIG. 2, compressing the spring 3. The user then releases the line, causing the spring to force the plunger 2 downwardly and delivering a blow against the upper end of the housing 1, jarring the collar 9 upwardly. Several blows may be necessary to cause the collar to move upwardly on the housing 1 until it clears the anchored portion of the spring wire 7, permitting the spring wire to move outwardly and disengaging the hook 10, permitting the fishing line and leader to be retrieved with only the loss of the hook.

When the hook is lodged into an object in the water, one or two impacts against the housing will release the hook by jarring it in the opposite direction from that in which it was being drawn when it became engaged with said object. Only in the event the hook is deeply impaled in the object to the extent that it can not be retrieved, will the successive impacts be used to disengage the hook from the hook engaging means.

Where a fish is caught on the hook, the movement of the fish in fighting against the line will be mere yieldable reciprocating movements of the plunger, without impact against the housing in the nature of blows that will drive the collar upwardly and release the hook engaging means, leaving the collar in locking position with relation to the hook engaging means.

What I claim is:

1. A fish hook release having a tubular housing, one end of said housing being open and the other end having a passageway through which a plunger mounted in said housing reciprocates and which is spring loaded to urge same toward the open end of said housing, an outwardly urged hook engaging means on said housing adjacent the open end of said housing and means for releasably maintaining said hook engaging means in engaging position.

2. The device defined in claim 1 wherein said plunger is spring loaded, constantly urging same into extended position, said hook engaging means being anchored at one point to said housing, means for releasing said hook engaging means consisting of a collar slidably mounted on said housing and movable into position over said hook engaging means to maintain said hook connected with said housing, and movable out of hook engaging relation by compressing said spring and then releasing said plunger to be driven against one end of said housing, jarring said collar upwardly until said collar is moved to a position above the anchor point of said hook engaging means.

3. The device defined in claim 1 wherein said hook engaging means consists of a spring wire anchored at one end to the outer surface of the housing and bent in a right angle adjacent its other end and ports in said housing through which said other end extends when in hook engaging position, said means for releasably retaining said hook engaging means comprising a collar freely slidably mounted on said housing and encompassing said spring wire in hook engaging position.

* * * * *